United States Patent [19]

Wittren

[11] 4,066,099

[45] Jan. 3, 1978

[54] ZERO LAP VALVE

[75] Inventor: Richard Arthur Wittren, Cedar Falls, Iowa

[73] Assignee: Deere & Company, Moline, Ill.

[21] Appl. No.: 714,567

[22] Filed: Aug. 16, 1976

[51] Int. Cl.² .............................................. F16K 11/07
[52] U.S. Cl. ........................... 137/625.66; 29/157.1 R; 137/625.67; 251/367
[58] Field of Search .............. 29/157.1 R; 137/625.22, 137/625.23, 625.24, 625.47, 625.48, 625.66, 625.67, 625.68; 251/367

[56] References Cited

U.S. PATENT DOCUMENTS

| | | | |
|---|---|---|---|
| 2,742,924 | 4/1956 | Harter | 137/625.48 |
| 2,920,650 | 1/1960 | Moog | 251/367 X |
| 3,189,049 | 6/1965 | Carlson | 251/367 X |
| 3,754,574 | 8/1973 | Andis | 137/625.23 X |
| 3,921,669 | 11/1975 | Goff | 137/625.24 |

Primary Examiner—Robert G. Nilson

[57] ABSTRACT

Zero lap valve includes two cylindrical valve member portions, each having passageways intersecting a bond surface thereof, and to valve body portions, each having a cylindrical cavity with radial ports intersecting the cavity and a bond surface thereof. The bond surfaces of the valve member portions are bonded together to form a valve member having passageways in one portion bounded by the bond surface of the other portion with the passageways in the two portions interconnected. The valve member is positioned in a valve body formed by bonding the bond surfaces of the valve body portions such that common ports in both portions have adjacent ports to either side in different portions. The valve member is axially slidable perpendicular to the bond surfaces such that the bond surfaces of the ports act as metering edges in cooperation with the bond surfaces of the passageways as the passageways interconnect one or the other of the adjacent ports to the common ports. When and only when the bond surfaces of the valve member member are coplanar with the bond surfaces of the valve body, the valve member passageways will be blocked from the adjacent ports with zero lap.

18 Claims, 6 Drawing Figures

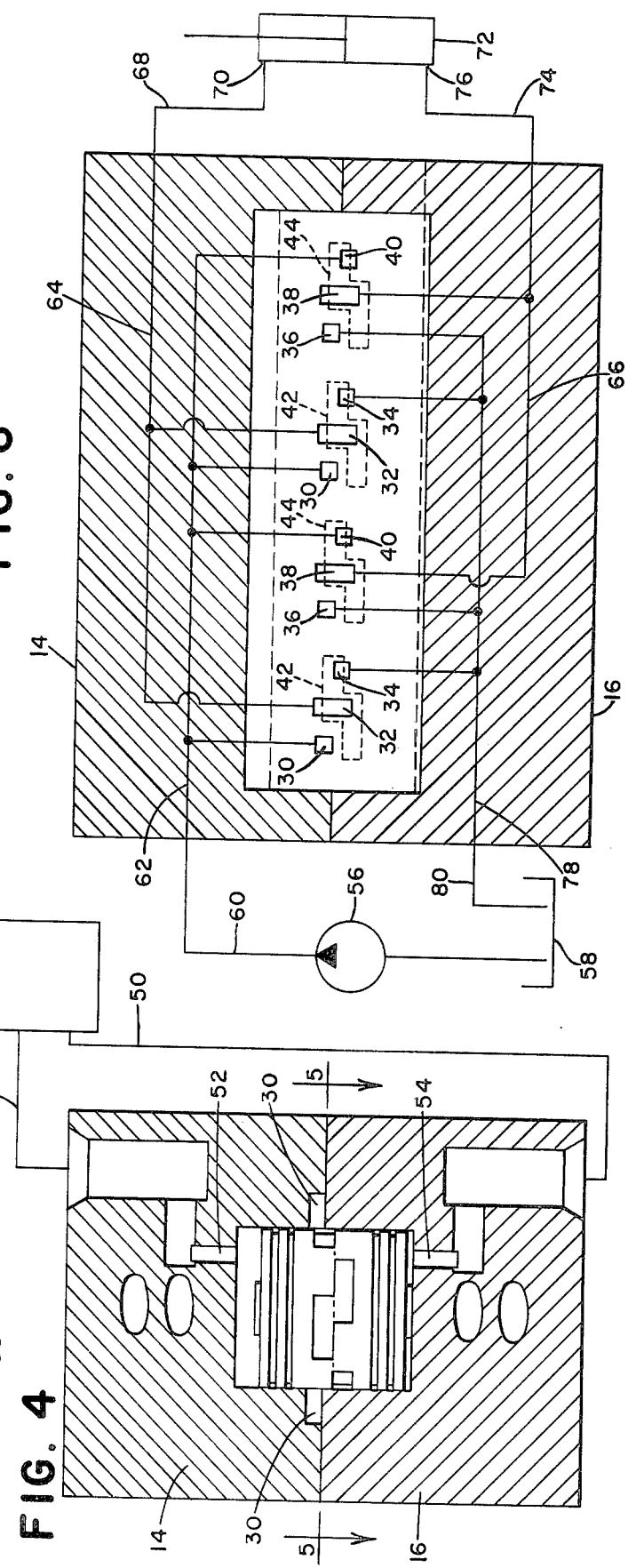

ZERO LAP VALVE

BACKGROUND OF THE INVENTION

The present invention relates generally to high performance servo valves and more particularly to a zero lap, high frequency response servo valve.

In the past, high performance servo valves were of conventional spool valve design but were manufactured using special tolerance, skill, and production techniques. In these servo valves, the valve body porting was accomplished by using a special spool bushing consisting of a plurality of separate segments which were precision controlled as to axial length and which were brazed together to form inlet, load and outlet ports. Spools were precision fitted into the spool bushings and then were uniquely matched thereto by machining the spool lands with special hydraulic gauging equipment to exactly match their corresponding ports so as to minimize the lap which is the length of the ports blocked position.

By utilizing precision manufacturing techniques, it is possible to minimize lap, but there will always be some under or over lap due to inherent tolerance variation in the spool valve design. The ideal high performance servo valve would be an easily manufactured valve having zero lap or minimum null shift, high frequency response, exact linearity and pressure gain, high spool driving forces, minimum resolution and hysteresis, high contamination tolerance, and long life with high reliability.

SUMMARY OF THE INVENTION

The present invention provides a zero lap servo valve in which a bonded two-piece valve body is utilized with a bonded two-piece valving member. At the bonded surfaces of the valve body and valve member there are provided a plurality of ports and passageways for which the bonded surfaces provide metering edges. Since all the critical metering edges are at the bonded surfaces of each body or member and a metal-to-metal contact is used during joining to provide zero thickness joints at the bond surfaces, the required precision for a high performance servo valve is obtained by merely controlling the flatness and perpendicularity of each of the four bond surfaces with respect to valve body bore and valve member outer diameter. This structure provides an ideal performance servo valve.

The above and additional advantages of the present written invention will become apparent to those skilled in the art from a reading of the following detailed description when taken in conjunction with the accompanying drawings.

BRIEF DESCRIPTION OF THE DRAWINGS

FIG. 4 is a cross-sectional view of the present invention in a second operative position taken along line 4—4 of FIG. 5;

FIG. 5 is a cross-sectional view of the present invention taken along line 5—5 of FIG. 4; and FIG. 6 is an operation schematic of the present invention in the second operative position shown in its operative environment in a developed view of FIG. 5.

DESCRIPTION OF THE PREFERRED EMBODIMENT

Figure 1:
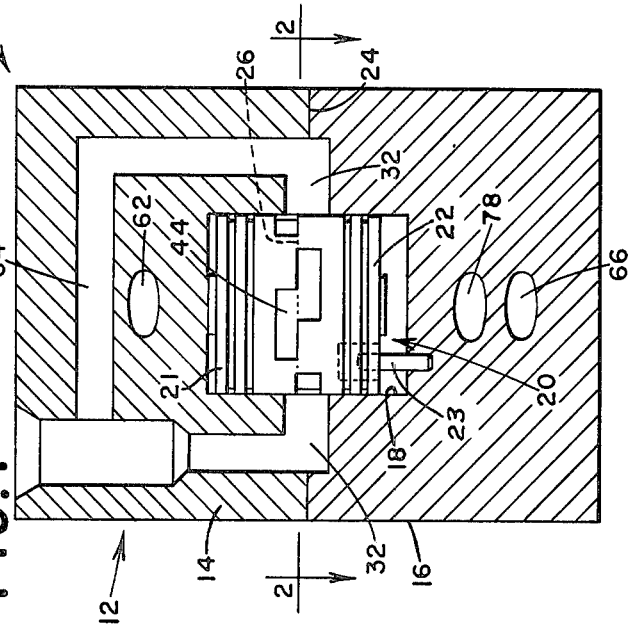
FIG. 1 is a cross-sectional view of the present invention in a first operative position taken along line 1—1 of FIG. 2.

Referring now to FIG. 1, therein is shown a zero lap servo valve 10 having a valve body 12 made up of a first and second valve body portions 14 and 16. The valve body 12 contains a cylindrical cavity 18 which slidably contains a two-piece valve member 20 which is made up of a first and second valve member portions 21 and 22. The valve member 20 is prevented from rotating by a pin 23.

The valve body portions 14 and 16 and the valve member portions 21 and 22 are joined, respectively, at a valve body bond surface 24 and a valve member bond surface 26 by brazing, diffusion welding (or bonding), or during the sintering process when powdered metal is used. Any metal-to-metal contact joining process may be used which will provide a zero thickness joint.

Figure 2:
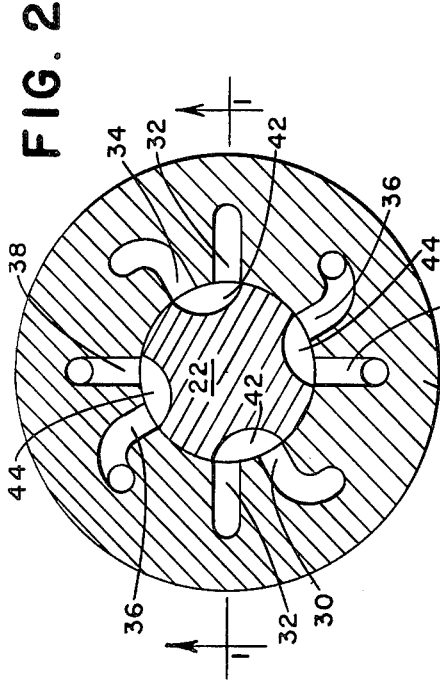
FIG. 2 is a cross-sectional view of the present invention taken along line 2—2 of FIG. 1.

Referring now to FIGS. 2 and 5, therein are shown various rectangular ports and passageways which are provided in the valve body 12 and the valve member 20 in which the port or passageway in one portion is bounded by the bond surface of the other portion and that the bond surface forms a metering edge. Progressing clockwise around the cylindrical cavity 18 of the valve body 12, therein is shown the first of a pair of diametrically opposite first inlet ports 30, the first of a pair of diametrically opposite load ports 32, and the first of a pair of diametrically opposite first outlet ports 34. Next is the first of a pair of diametrically opposite second outlet ports 36, the first of a pair of diametrically opposite second load ports 38, and the first of a pair of diametrically opposite second inlet ports 40. Continuing clockwise around the cylindrical cavity 18, the second of the pairs of various ports will be encountered having the same number as the first of the pair.

Progressing clockwise around the valve member 20, therein is shown the first of a pair of diametrically opposite first passageways 42 and then the first of a pair of diametrically opposite second passageways 44. The circuit is completed past the second of the pair of first passageways 42 and the second of the pair of second passageways 44, respectively. The passageways 42 and 44 are formed of slots in the valve member portions 21 and 22 before they are bonded together. Each of the pair of passageways 42 and 44 is made up of an inlet portion generally designated by 42a and 44a, a load portion generally designated by 42b and 44b and an outlet portion generally designated by 42c and 44c as shown in FIG. 3.

Referring now to FIG. 4, therein is shown a part of the operative controls which function to move the valve member 20 slidably and reciprocally in the valve body 12. A conventional operator control 46 provides a differential pressure signal to a first pilot line 48 or a second pilot line 50 which are respectively connected to a first pilot port 52 in the first valve body portion 14 and to a second pilot port 54 in the second valve body portion 16.

Figure 3:
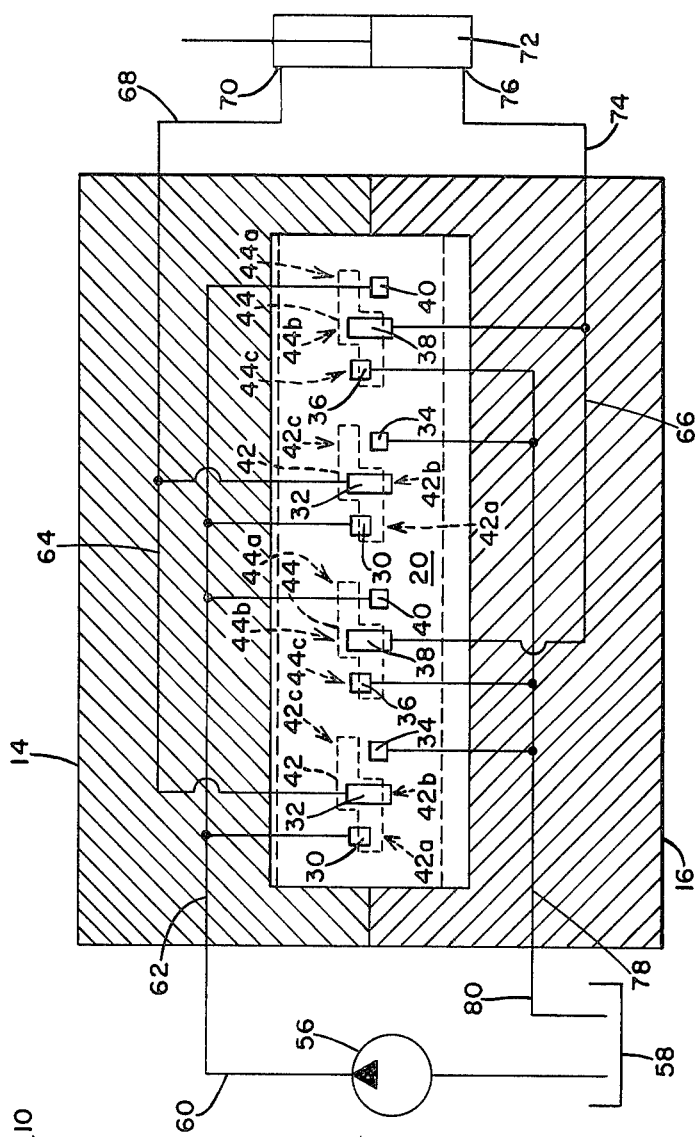
FIG. 3 is an operation schematic of the present invention in the first operative position shown in its operative environment in a developed view of FIG. 2.

Referring now to FIGS. 3 and 6, therein are shown developed views of the cylindrical surface of the cylindrical cavity 18 starting with the first of the first inlet ports 30 and progressing clockwise around the cylinder surface and a hydraulic schematic of a typical hydraulic system in which the zero lap servo valve 10 would be utilized. The hydraulic system includes a pump 56 supplied from a fluid reservoir 58 and supplying a pressurized fluid output to a pressure line 60. The pressure line 60 is connected to an inlet passage 62 in the first valve body portion 14. The inlet passage 62 in turn is connected to the first and second inlet ports 30 and 40.

Depending on the position of the valve member 20 as will later be explained, the inlet passage 62 will be fluidly connected to a first load passage 64 or a second load passage 66. The first load passage 64 may be connected to an independent first load by a first line 68 or, as shown in the preferred embodiment, to a first port 70 of a cylinder 72. The second load passage 66 may likewise be connected to an independent second load by a second line 74 or to a second port 76 in the cylinder 72.

As will later be explained, the first and second load passages 64 and 66 may be fluidly selectively connected by an outlet passage 78 to a reservoir line 80 and thence to the reservoir 58.

In operation, a pressurized output from the operator control 46 to the second pilot port 54 will urge the valve member 20 to the position shown in FIG. 1. As may be more easily understood from FIG. 3 wherein the outer surface of the valve member 20 is shown as a dotted line superimposed over the ports in the valve body 12, the pressurized fluid from the pump 56 will be connected through the first inlet ports 30, the first passageways 42, and the first load ports 32 to the first port of the cylinder 72. As is evident, the first passageways 42 will be blocked from the first outlet ports 34 and likewise the second inlet ports 40 will be blocked from the second passageways 44. The second port 76 of the cylinder 72 will be connected through the second load ports 38, the second passageways 44, and the second outlet ports 36 to the reservoir 58.

When the operator control 46 provides pressurized fluid to the first pilot line 48 which is greater than in the second pilot line 50, the valve member 20 moves towards the position shown in FIG. 4. When the plane of the valve member bonded surface 26 is coplanar with the plane of the valve body bonded surface 24, the first and second load ports 32 and 38 will be instantaneously blocked from all the other ports with zero lap. As may best be seen from FIG. 6, when the valve member 20 abuts the second valve body portion 16, the pump 56 will be fluidly connected through the second inlet ports 40, the second passageways 44, and the second load ports 38 to the second port 76 of the cylinder 72. The first inlet ports 30 will be blocked from the first passageways 42 and the second outlet ports 36 will be blocked from the second passageways 44. The first port 70 of the cylinder 72 will be fluidly connected through the first load ports 32, the first passageways 42, and the first outlet ports 34 to the reservoir 58. Thus, it is possible to supply pressurized fluid from the pump 56 to either side of the cylinder 72 with a minimal null-shift or dead band. Further, since the ports and passageways are of rectangular cross section, the valve 10 will have linear gain characteristics or linear increases and decreases of flow therethrough.

While the invention has been described in conjunction with a specific embodiment, it is to be understood that many alternatives, modifications, and variations will be apparent to those skilled in the art in light of the foregoing description. Accordingly, it is intended to embrace all such alternatives, modifications, and variations which fall within the spirit and scope of the appended claims.

I claim:

1. A zero lap valve comprising: a valve body including two valve body portions, each of said valve body portions having a bond surface bonded to the bond surface of the other valve body portion and having a cavity provided therein intersecting the bond surface, and one of said valve body portions having inlet and outlet ports provided therein intersecting the bond surface and the cavity; and a valve member slidably disposed within said cavity in the valve body and including two valve member portions, each of said valve member portions having a bond surface parallel to the bond surfaces of the valve body portions and bonded to the bond surface of the other valve member portion, and one of said valve member portions having a passageway provided therein intersecting the bond surface and the surface of the valve member proximate said ports, said one of said valve member portions being on the opposite side of the bond surfaces from said one of said valve body portions when the bond surfaces are in a coplanar position so that the inlet and outlet ports are connected by the passageway on one side of the coplanar position and unconnected on the other side of the coplanar position.

2. The zero lap valve as claimed in claim 1 wherein the inlet and outlet ports in the valve body have generally rectangular cross sections and wherein the passageway provided in the valve member has a generally rectangular cross section.

3. A zero lap valve comprising: a valve body including two valve body portions, each of said valve body portions having a bond surface bonded to the bond surface of the other valve portion to provide a zero thickness bond, a cavity provided therein intersecting the bond surface, and a port provided therein intersecting the bond surface and the cavity; a valve member slidably disposed within said cavity in the valve body and including two valve member portions, each of said valve member portions having a bond surface bonded to the bond surface of the other valve portion to provide a zero thickness bond, and one of said valve member portions having a passageway provided therein intersecting the bond surface and a surface of the valve member proximate the ports so that the ports are connected by the passageway on one side of a position wherein the bond surfaces are coplanar and unconnected on the other side of the coplanar position.

4. The zero lap valve as claimed in claim 3 wherein the ports provided in the valve body have generally rectangular cross sections and wherein the passageway provided in the valve member has a generally rectangular cross section.

5. A zero lap valve comprising: a valve body including two valve body portions, each of said valve body portions having a bond surface bonded to the bond surface of the other valve body portion and having a cavity provided therein intersecting the bond surface, one of said valve body portions having a first port provided therein intersecting the bond surface and the cavity connectible to a source of fluid pressure and a second port provided therein intersecting the bond surface and the cavity connectible to a fluid load, the other of said valve body portions having a third port provided therein and intersecting the bond surface and the cavity cooperating with the second port and connectible thereto and a fourth port provided therein intersecting the bond surface and the cavity connectible to a fluid reservoir; and a valve member slidably disposed within said cavity in the valve body and including two valve member portions, each of said valve member portions having a bond surface bonded to the bond surface of the other valve member portion and having a passageway provided therein intersecting the bond surface connected to the passageway in the other valve member portion, said valve member slidable from a first position wherein the first and second ports are fluidly connected through the passageway in said one of said valve member portions through a null position when the bond surface of the valve body portions and the valve member portions are coplanar wherein the first and fourth ports are blocked from the second and third ports to a second position wherein the third and fourth ports are fluidly connected through the passageway in said other of said valve member portions.

6. The zero lap valve as claimed in claim 5 wherein the first, second, third, and fourth ports provided in the valve body have generally rectangular cross sections and wherein the passageways in the valve member have generally rectangular cross sections whereby the valve will have linear gain characteristics.

7. A zero lap valve comprising: a bonded two piece valve body having a cylindrical cavity provided therein and having a load port provided therein intersecting said cavity spanning both pieces and connectible to a fluid load, an inlet port provided in one of the pieces adjacent the other piece and intersecting said cavity radially to one side of the load port and connectible to a source of pressurized fluid, and a outlet port provided in the other piece adjacent the one of the pieces and intersecting said cavity radially to the other side of the load port and connectible to a fluid reservoir; a bonded two piece valve member having a cylindrical surface slidably positioned in said cavity and having passageway means provided therein including a load portion intersecting the cylindrical surface and spanning both pieces and fluidly connected to the load port, an inlet portion intersecting the cylindrical surface radially to one side of the load portion in one of the pieces adjacent to the other piece and selectively fluidly connectible to the inlet port, and an outlet portion intersecting the cylindrical surface radially to the other side of the load portion in the other piece adjacent the one of the pieces and selectively fluidly connectible to the outlet port; said valve member axially and reciprocally slidable in the valve body from a first position, wherein the inlet portion is fluidly connected to the inlet port whereby the inlet port is connected through the passageway means to the load port, through a null position, wherein the inlet and outlet portions are fluidly unconnected to the inlet and outlet ports whereby the inlet and outlet ports are blocked from the load port, to a second position, wherein the outlet portion is fluidly connected to the outlet port whereby the outlet port is fluidly connected through the passageway means to the load port.

8. The zero lap valve as claimed in claim 7 wherein the load, inlet, and outlet ports provided in the valve body have generally rectangular cross sections and wherein the load, inlet, and outlet portions of the passageway means have generally rectangular cross sections whereby the valve will have linear gain characteristics as the valve member is moved between the first and second positions.

9. The zero lap valve as claimed in claim 7 wherein the valve body includes port means provided therein intersecting the ends of said cylindrical cavity for the input and exhaust of pressurized fluid to move the valve member between the first and second positions.

10. In a hydraulic system having a source of pressurized fluid, a fluid load, and a fluid reservoir, a zero lap valve comprising: a bonded two piece valve body having a cylindrical cavity provided therein and having an elongated load port provided therein intersecting said cavity and spanning bonded surfaces of the valve body with the major axis of the load port parallel to the axis of said cavity and connectible to the fluid load, an inlet port provided therein intersecting said cavity radially to one side of the load port extending from the bonded surfaces towards one end of said cavity and connectible to the source of pressurized fluid, and an outlet port provided therein intersecting said cavity radially to the other side of the load port extending from the bonded surfaces towards the other end of said cavity and connectible to the fluid reservoir; a bonded two piece valve member having a cylindrical surface slidably positioned in said cavity and having passageway means provided therein including an elongated load portion provided therein intersecting said cavity spanning bonded surfaces of the valve member with the major axis of the load portion parallel to the axis of the load port and fluidly connected to the load port, an inlet portion extending radially from one side of the load portion and from the bonded surfaces towards the other end of said cavity selectively fluidly connectible to the inlet port, an outlet portion extending radially from the other side of the load portion and from the bonded surfaces towards the one end of said cavity selectively fluidly connectible to the outlet port; said valve member axially and reciprocally slidable in the valve body from a first position wherein the inlet portion is fluidly connected to the inlet port whereby the inlet port is connected through the passageway means to the load port, through a null position, wherein the bonded surfaces of the valve body and the valve member are coplanar and the inlet and outlet portions are fluidly unconnected to the inlet and outlet ports whereby the inlet and outlet ports are blocked from the load port, to a second position, wherein the outlet portion is fluidly connected to the outlet port whereby the outlet port is fluidly connected through the passageway means to the load port.

11. The zero lap valve as claimed in claim 10 wherein the load, inlet, and outlet ports provided in the valve body have generally rectangular cross sections and wherein the load, inlet and outlet portions of the passageway means provided in the valve member have generally rectangular cross sections whereby the valve will have linear gain characteristics when the valve member is moved between the first and second positions.

12. The zero lap valve as claimed in claim 10 wherein the valve body includes inlet and outlet port means provided at the ends of the cylindrical cavity and intersecting therewith for the input and exhaust of pressurized fluid to move the valve member between the first and second positions.

13. A zero lap valve comprising: a valve body including two valve body portions, each of said valve body portions having a bond surface bonded to the bond surface of the other valve portion and having a cylindrical cavity provided therein intersecting the bond surface, one of said valve body portions having a pair of first load ports provided therein intersecting the bond surface and the cavity with each of said first load ports diametrically opposite the other and commonly connectible to a first load, a pair of second load ports provided therein intersecting the bond surface and the cavity with each of said second load ports diametrically opposite the other and spaced a quadrant away from the first load ports around the cavity and commonly connectible to a second load, a pair of first inlet ports provided therein intersecting the bond surface and the cavity with each of said first inlet ports diametrically opposite the other between the first and second load ports and adjacent the first load ports and commonly connectible to a source of pressurized fluid, and a pair of second outlet ports provided therein intersecting the bond surface with each of said second outlet ports diametrically opposite the other between the first and second load ports and adjacent the second load port and commonly connectible to a fluid reservoir; the other of said valve body portions having a pair of first load ports provided therein intersecting the bond surface and the cavity with each of said first load ports diametrically opposite the other and contiguous to one of the pair of first load ports in the one of said valve body portions, a pair of second load ports provided therein intersecting the bond surface and the cavity with each of said second load ports diametrically opposite the other and contiguous to one of the pair of second load ports in the one of said valve body portions, a pair of first outlet ports provided therein intersecting the bond surface and the cavity with each of said first outlet ports diametrically opposite the other between the first and second load ports adjacent the first load port and commonly connectible to the fluid reservoir, and a pair of second inlet ports provided therein intersecting the bond surface and the cavity with each of said second inlet ports diametrically opposite the other between the first and second load ports adjacent the second load ports and commonly connectible to the source of pressurized fluid; and a cylindrical valve member slidably disposed within said cavity in the valve body and including two valve member portions, each of said valve member portions having a bond surface perpendicular to the cylindrical surface bonded to the bond surface of the other valve member portion and having two pairs of passageways provided therein intersecting the bond surface and the cylindrical surface coupled to and offset from each of the two pairs of passageways in the other valve member portion; said valve member slidable from a first position wherein the first inlet ports are connected to the first load ports and the second load ports are connected to the second outlet ports through the passageways in the valve member, through a null position wherein the bond surfaces of the valve body portions and the valve member portions are coplanar wherein the passageways are blocked from the inlet and outlet ports to a second position wherein the first load ports are connected to the first outlet ports and the second inlet ports are connected to the second load ports.

14. The zero lap valve as claimed in claim 13 wherein the first and second load, inlet, and outlet ports provided in the valve body have generally rectangular cross sections and wherein the passageways in the valve member have generally rectangular cross sections whereby the valve will have linear gain characteristics as the valve member is moved from its first to its second position.

15. The zero lap valve as claimed in claim 13 wherein the valve body includes input and exhaust port means provided therein and intersecting the cylindrical cavity at both ends for the input and exhaust of pressurized fluid to move the valve member between the first and second positions.

16. In a hydraulic system having a source of pressurized fluid, a fluid load having first and second load ports and a fluid reservoir, a zero lap valve comprising: a bonded two piece valve body having a cylindrical cavity provided therein; said valve body having a pair of first load ports provided therein intersecting said cavity spanning bonded surfaces of the valve body with each of said first load ports diametrically opposite the other and commonly connectible to the first fluid load, a pair of second load ports provided therein intersecting said cavity spanning the bonded surfaces of the valve body with each of said second load ports diametrically opposite the other and spaced equally from the pair of first load ports and commonly connectible to the second fluid load, a pair of first inlet ports provided therein intersecting said cavity with each of said first inlet ports diametrically opposite the other radially to one side of said first load ports and extending from the bonded surfaces towards one end of said cavity commonly connectible to the source of pressurized fluid, a pair of second inlet ports provided therein intersecting said cavity with each of said second inlet ports diametrically opposite the other radially to one side of each of said second load ports and extending from the bonded surfaces towards the other end of said cavity commonly connectible to the source of pressurized fluid, a pair of first outlet ports provided therein intersecting said cavity with each of said first outlet ports diametrically opposite the other radially to the other side of each of said first load ports and extending from the bonded surfaces towards the other end of said cavity commonly connectible to the fluid reservoir, and a pair of second outlet ports provided therein intersecting said cavity with each of said second outlet ports diametrically opposite the other radially to the other side of each of said second load ports and extending from the bonded surfaces towards the one end of said cavity commonly connectible to the fluid reservoir; a bonded two piece valve member having a cylindrical surface slidably positioned in said cavity; said valve member having a pair of first passageway means provided therein with each of said first passageway means diametrically opposite the other; each of said first passageway means including an elongated first load portion spanning bonded surfaces of the valve member and intersecting the cylindrical surface and fluidly connected to one of the pair of first load ports, a first inlet portion extending radially from one side of the first load portion and from the bonded surfaces towards the one end of said cavity and selectively fluidly connectible to one of the pair of first inlet ports, and a first outlet portion extending radially from the other side of the first load portion and from the bonded surfaces towards the other end of said cavity and selectively fluidly connectible to one of the pair of first outlet ports; said valve member having a pair of second passageway means provided therein with each of said second passageway means diametrically opposite the other; each of said second passageway means including an elongated second load portion intersecting the cylindrical surface and fluidly connected to one of the pair of second load ports, a second inlet portion extending radially from one side of the second load portion and from the bonded surfaces towards the other end of said cavity and selectively fluid connectible to one of the pair of second inlet ports, and a second outlet portion extending radially from the other side of the second load portion and from the bonded surfaces towards the one end of said cavity and selectively fluidly connectible to one of the pair of second outlet ports; said valve member axially and reciprocally slidable in the valve body from a first position, wherein the first inlet portions are fluidly connected to the first inlet ports whereby the first inlet ports are connected through the first passageway means to the first load port and wherein the second outlet portions are fluidly connected to the second outlet ports whereby the second outlet ports are connected through the second passageway means to the second load ports, through a null position, wherein the first and second inlet and outlet portions are fluidly unconnected to the first and second inlet and outlet ports whereby the first and second inlet ports are fluidly blocked from the first and second load ports, to a second position, wherein the first oulet portions are fluidly connected to the first outlet ports whereby the first outlet ports are fluidly connected through the first passageway means to the first load ports and wherein the second inlet portions are fluidly connected to the second inlet ports whereby the second inlet ports are fluidly connected through the second passageway means to the second load ports.

17. The zero lap valve as claimed in claim 16 wherein the first and second load, inlet, and outlet ports provided in the valve body have generally rectangular cross sections and wherein the first and second load, inlet, and outlet portions of the pair of first and second passageway means have generally rectangular cross sections whereby the valve will have linear gain characteristics as the valve member is moved from its first to its second position.

18. The zero lap valve as claimed in claim 16 wherein the valve body includes input and exhaust port means provided therein and intersecting the cylindrical cavity at both ends for the input and exhaust of pressurized fluid to move the valve member between the first and second positions.

* * * * *